United States Patent
Matsuno

(10) Patent No.: US 9,514,649 B2
(45) Date of Patent: Dec. 6, 2016

(54) VEHICLE DRIVING SUPPORT DEVICE

(71) Applicant: Fuji Jukogyo Kabushiki Kaisha, Tokyo (JP)

(72) Inventor: Kouji Matsuno, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/764,684

(22) Filed: Feb. 11, 2013

(65) Prior Publication Data
US 2013/0218433 A1  Aug. 22, 2013

(30) Foreign Application Priority Data

Feb. 16, 2012 (JP) ................. 2012-031999

(51) Int. Cl.
| | |
|---|---|
| *G08G 1/16* | (2006.01) |
| *B60W 30/09* | (2012.01) |
| *G06K 9/00* | (2006.01) |
| *B60W 10/06* | (2006.01) |
| *B60W 10/188* | (2012.01) |
| *B60W 30/095* | (2012.01) |

(52) U.S. Cl.
CPC .............. *G08G 1/166* (2013.01); *B60W 10/06* (2013.01); *B60W 10/188* (2013.01); *B60W 30/09* (2013.01); *B60W 30/0956* (2013.01); *G06K 9/00208* (2013.01); *G06K 9/00805* (2013.01); *B60T 2201/022* (2013.01); *B60T 2201/12* (2013.01); *B60W 2550/304* (2013.01); *B60W 2550/306* (2013.01)

(58) Field of Classification Search
None
See application file for complete search history.

(56) References Cited

U.S. PATENT DOCUMENTS

| | | | | |
|---|---|---|---|---|
| 5,031,101 | A * | 7/1991 | Kamimura et al. ............ 701/23 |
| 6,044,321 | A * | 3/2000 | Nakamura et al. ............ 701/96 |
| 7,388,182 | B2 * | 6/2008 | Schofield et al. ............ 250/205 |
| 8,103,451 | B2 * | 1/2012 | Tanimichi et al. ........... 701/301 |
| 2004/0153217 | A1 * | 8/2004 | Mattes ............... B60K 31/0008 701/1 |
| 2006/0030450 | A1 * | 2/2006 | Kyle ....................... B60K 6/26 477/3 |
| 2006/0097504 | A1 * | 5/2006 | Akaba et al. ................. 280/806 |
| 2006/0142121 | A1 * | 6/2006 | Moriya ........................ 477/199 |
| 2007/0114838 | A1 * | 5/2007 | Bitz ............................... 303/11 |
| 2008/0058162 | A1 * | 3/2008 | Schmidt ....................... 477/184 |
| 2008/0136251 | A1 * | 6/2008 | Lee ............................ 303/113.2 |
| 2009/0174573 | A1 * | 7/2009 | Smith .......................... 340/905 |
| 2009/0230761 | A1 * | 9/2009 | Sekiguchi et al. ............... 303/2 |
| 2009/0271087 | A1 * | 10/2009 | Motonaga ..................... 701/102 |
| 2009/0299578 | A1 * | 12/2009 | Lucas et al. ................... 701/46 |
| 2010/0076656 | A1 * | 3/2010 | Hiyoshi et al. ................. 701/70 |
| 2011/0130936 | A1 * | 6/2011 | Noda ............................. 701/70 |
| 2012/0141299 | A1 * | 6/2012 | Bang ...................... B60T 13/52 417/22 |
| 2013/0057055 | A1 * | 3/2013 | Miyashita ............... B60T 13/52 303/12 |

FOREIGN PATENT DOCUMENTS

JP  2005-225453 A  8/2005

* cited by examiner

*Primary Examiner* — Rami Khatib
*Assistant Examiner* — Nicholas K Wiltey
(74) *Attorney, Agent, or Firm* — McDermott Will & Emery LLP

(57) ABSTRACT

There is provided a vehicle driving support device. The vehicle driving support device according to the present invention calculates a time-to-collision to an obstacle ahead. When the time-to-collision is shorter than a predetermined threshold value, which means the possibility of the collision between the obstacle and a vehicle is determined to be high, and in at least either one of cases in which an engine automatic stop controller automatically stops an engine and in which a brake negative pressure is higher than a set pressure, so that the negative pressure of a brake booster is insufficient, the device outputs a signal to a brake controller so as to start a pump of a brake driver for realizing a prefill function in which a brake pad of each wheel is pressed against a braking surface of a disc rotor.

13 Claims, 2 Drawing Sheets

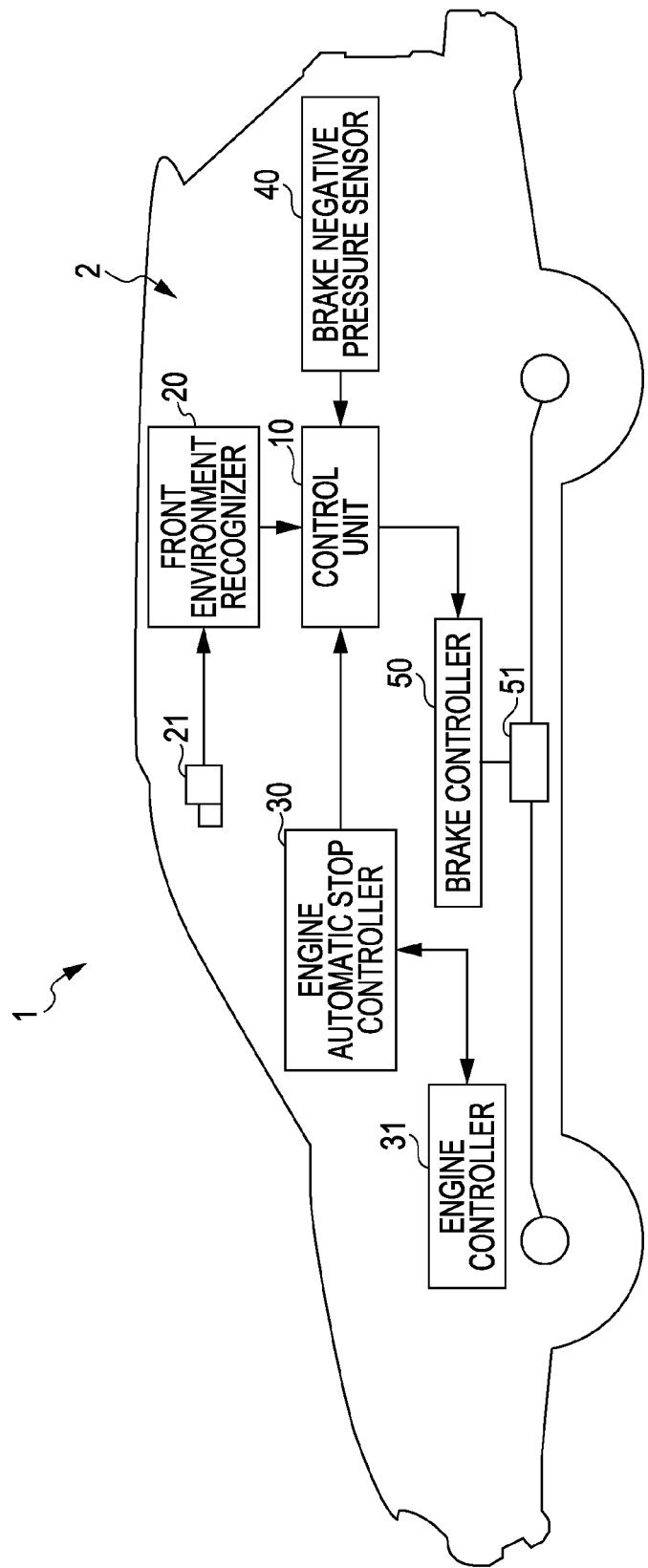

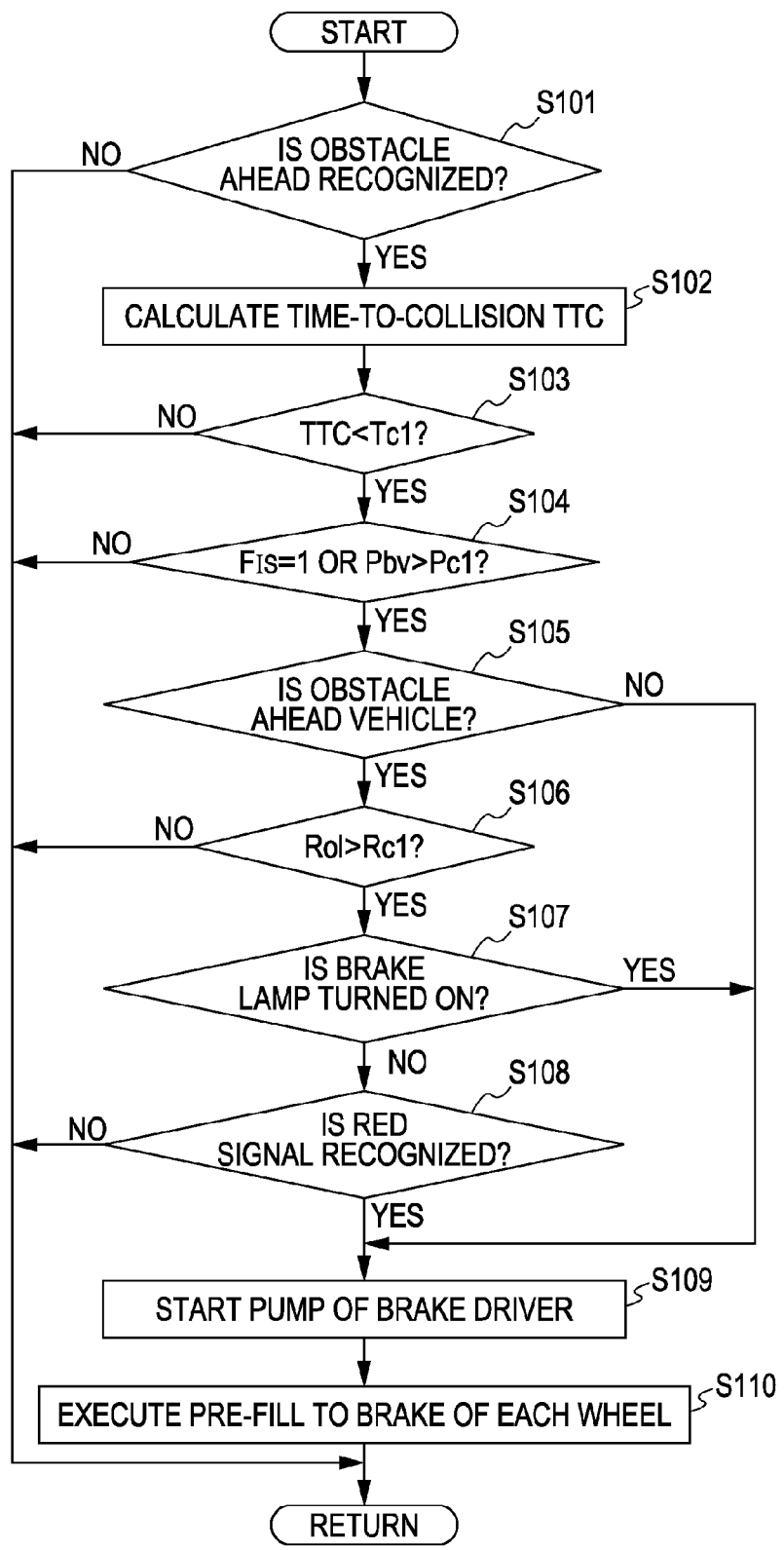

VEHICLE DRIVING SUPPORT DEVICE

CROSS-REFERENCE TO RELATED APPLICATIONS

The present application claims priority from Japanese Patent Application No. 2012-031999 filed on Feb. 16, 2012, the entire contents of which are hereby incorporated by reference.

BACKGROUND OF THE INVENTION

1. Field of the Invention

The present invention relates to a vehicle driving support device that appropriately avoids collision with an obstacle recognized ahead in a vehicle provided with an idle stop system or a vehicle, such as a hybrid vehicle, provided with an engine automatic stop function.

2. Description of Related Art

Recently, various collision avoidance control systems for vehicles have been developed and put to practical use. For example, Japanese Unexamined Patent Publication (JP-A) No. 2005-225453 describes a technique of a brake support system. In this technique, a time-to-collision (TTC) that is a value obtained by dividing a relative distance to an obstacle ahead of a vehicle by a relative speed to the obstacle is defined as a first parameter, an accelerator pedal release rate of a driver to the time-to-collision TTC upon an emergence of the obstacle ahead of the vehicle is defined as a second parameter, and a brake assist for a collision avoidance control is executed based upon a brake operation behavior characteristic map that illustrates a driver's brake operation behavior characteristic based upon information indicating a relationship between the first parameter and the second parameter.

On the other hand, a vehicle provided with an idle stop system or a vehicle, such as a hybrid vehicle, provided with an engine automatic stop function has been put into practical use in order to enhance fuel efficiency and to cope with environmental problems. When the brake support system described in JP-A No. 2005-225453 is applied to the vehicle having the engine automatic stop function, the brake assist system based upon a brake booster by a negative pressure of an engine cannot satisfactorily be operated during the stop of the engine, and hence, a desired safety performance might not be attained. In view of this, it is considered that the deterioration in the function of the negative-pressure brake booster during the stop of the engine is made up with an application of pressure by a pump of a brake driver, as a basic function of the vehicle having the engine automatic stop function. However, there arises a problem that, even if the pump is started after a driver's sudden braking operation is detected, a pressure-rising performance sufficient for the brake assist function cannot be attained, considering the responsiveness of a pump motor.

BRIEF SUMMARY OF THE INVENTION

The present invention is accomplished in view of the above-mentioned circumstance, and aims to provide a vehicle driving support device that can satisfactorily prevent collision with an obstacle ahead, while enhancing fuel efficiency by an engine automatic stop function and taking effective measures to environmental problems.

An aspect of the present invention provides a vehicle driving support device that includes: a front environment recognizing unit for recognizing an environment in front of a vehicle; a collision determining unit for making a determination through a comparison between an evaluation value, by which a possibility of collision between an obstacle in front of the vehicle and the vehicle is set in advance, and a predetermined threshold value when the front environmental recognizing unit recognizes the obstacle; an engine automatic stop control unit for automatically stopping an engine when a driving condition set in advance is established; and a brake control unit for starting a pump serving as a brake driving unit, when the collision determining unit determines that the possibility of the collision between the obstacle and the vehicle is high, and at least in one of a case in which the engine automatic stop control unit automatically stops the engine and a case in which a negative pressure of a brake booster is insufficient.

BRIEF DESCRIPTION OF THE SEVERAL VIEWS OF THE DRAWINGS

FIG. 1 is a schematic diagram illustrating a configuration of a vehicle driving support device mounted to a vehicle according to an embodiment of the present invention; and FIG. 2 is a flowchart illustrating a drive support control program according to the embodiment of the present invention.

DETAILED DESCRIPTION OF THE INVENTION

Hereinafter, an embodiment of the present invention will be described with reference to the drawings.

In FIG. 1, a vehicle 1 such as an automobile includes a vehicle driving support device 2 that recognizes an obstacle or another vehicle in front of the vehicle 1 and executes a drive support control (collision avoidance control).

The vehicle driving support device 2 mainly includes a front environment recognizer 20, an engine automatic stop controller 30, a brake negative pressure sensor 40, and a brake controller 50, these units being connected to a control unit 10.

The front environment recognizer 20 is provided as a front environment recognizing unit for recognizing an environment in front of the vehicle 1. The front environment recognizer 20 receives image information from a pair of left and right CCD cameras 21 (stereo cameras, not illustrated), and a vehicle speed V. The CCD cameras are mounted at a front part of a ceiling in a compartment so as to be separated with a constant distance, and employ a solid-state image sensor, such as a charge coupling device (CCD), that stereoscopically captures a subject at the outside of the vehicle from different angles of view, and outputs information of the captured image. The front environment recognizer 20 recognizes front information such as data of three-dimensional object or white line in front of the vehicle 1 based upon the image information from the stereo cameras 21.

The front environment recognizer 20 performs the process of the image information from the stereo cameras 21 as described below, for example. Firstly, the front environment recognizer 20 generates distance information from a pair of stereoscopic images formed by capturing an environment in the traveling direction of the vehicle 1 by the stereo cameras 21. The distance information is generated by a deviation amount between corresponding positions according to a principle of triangulation. The front environment recognizer 20 performs a known grouping process to the distance information, and compares the distance information to which the grouping process is performed to data of three-dimensional road shape or data of three-dimensional object, which are set beforehand, thereby extracting data of white line, data of sidewall such as a guard rail or a curb present along a road, and data of three-dimensional object such as an obstacle, a vehicle, or a traffic light. The front environment recognizer 20 also estimates a driving lane of the vehicle based upon the data of the white line or the data of the sidewall, and extracts (detects) the three-dimensional object present closest to the vehicle 1 on the driving lane of the vehicle 1 as an obstacle. When the obstacle is recognized as a vehicle, the front environment recognizer 20 recognizes this vehicle as a vehicle ahead of the vehicle 1. When recognizing the vehicle ahead, the front environment recognizer 20 calculates a ratio of a portion where the rear surface of the vehicle ahead overlaps the width of the vehicle 1, as a lap ratio Rol, from the positional relationship between the vehicle ahead and the vehicle 1 on a two-dimensional coordinate. When recognizing the vehicle ahead, the front environment recognizer 20 also determines whether a red brake lamp is turned on or not based upon a brightness change at the rear of the vehicle ahead. The front environment recognizer 20 also recognizes a three-dimensional object that is provided to a height not less than a predetermined height from a road surface and that has lighting portions of red, blue, or yellow, as a traffic light.

When recognizing the obstacle including the vehicle ahead, the front environment recognizer 20 calculates, as the information of the obstacle, a relative distance between the vehicle 1 and the obstacle (the distance from the vehicle 1 to the obstacle) Lobj, a relative speed between the obstacle and the vehicle 1 (a temporal change of the relative distance Lobj) Vfo, and a moving speed Vf of the obstacle (=relative speed Vfo+speed V of the vehicle 1). In this way, the information (the information of the obstacle, the information of the vehicle ahead, the information of the traffic light) of the front environment recognized and extracted by the front environment recognizer 20 is outputted to the control unit 10. In the present embodiment, the front environment recognizer 20 performs the above-mentioned recognition process based upon the image information from the stereo cameras 21. However, it may perform the process with a monocular camera.

The engine automatic stop controller 30 outputs a signal to the engine controller 31 so as to make an idle stop that stops the idling operation of the engine to automatically stop the engine, when a driving condition (engine automatic stop condition: idle stop execution condition) set beforehand is established. The idle stop execution condition means that all conditions, such as the condition in which a brake pedal is depressed, the condition in which an accelerator pedal is not depressed, the condition in which a shift lever position is any one of "P", "N", "D", "third-speed", "second-speed", and "first-speed", the condition in which the vehicle speed is almost zero, and the condition in which the capacity of a battery is sufficient, are satisfied.

When an engine restart condition set beforehand is established while the engine is automatically stopped by the idle stop, the engine automatic stop controller 30 outputs a signal to the engine controller 31 to restart the engine. The engine restart condition means that the above-mentioned idle stop execution condition is not established. As described above, the engine automatic stop controller 30 serves as an engine automatic stop control unit.

A master cylinder (not illustrated) connected to the brake pedal operated by a driver is connected to a brake driver 51 of the vehicle. When the driver operates (depresses) the brake pedal, a brake pressure is applied to each of four wheels, not illustrated, through the brake driver 51 by the master cylinder, whereby brakes are applied to four wheels, and hence, four wheels are stopped.

The brake driver 51 is a hydraulic unit including a pump, a pressure reducing valve, a pressure booster valve, and the like (not illustrated). It is configured to freely input brake pressure to each wheel cylinder independently according to an input signal from the brake controller 50, and to start the pump according to the input signal from the brake controller 50 so as to realize a prefill function in which a brake pad of each wheel is pressed toward a braking surface of a disk rotor. As described above, the brake driver 51 is provided as a brake driving unit in the present embodiment.

The control unit 10 receives various information of an environment ahead (information of an obstacle, information of a vehicle ahead, information of a traffic light, etc.) extracted by the above-mentioned front environment recognizer 20, receives a signal (engine automatic stop execution flag FIS: a flag that is set to 1 when the engine is automatically stopped) indicating whether the engine is automatically stopped or not from the engine automatic stop controller 30, and receives a brake negative pressure Pbv from the brake negative pressure sensor 40.

The control unit 10 executes the collision avoidance control in accordance with a later-described drive support control program illustrated in FIG. 2 based upon these input signals. Specifically, the control unit 10 divides the relative distance Lobj to the obstacle ahead of the vehicle 1 by the relative speed Vfo to the obstacle to calculate the time-to-collision TTC. When the time-to-collision TTC is shorter than a predetermined threshold value Tc1, which means the possibility of the collision between the obstacle and the vehicle 1 is determined to be high, and in at least either one of cases in which the engine automatic stop controller 30 automatically stops the engine and in which the brake negative pressure Pbv is higher than a set pressure Pct so that the negative pressure of the brake booster is insufficient, the control unit 10 outputs a signal to the brake controller 50 so as to start the pump of the brake driver 51 for realizing the prefill function in which the brake pad of each wheel is pressed against the braking surface of the disc rotor. In other words, the control unit 10 serves as a collision determining unit, and the control unit 10 and the brake controller 50 serve as a brake control unit.

Subsequently, the drive support program will be descried with reference to the flowchart in FIG. 2.

Firstly, in step (hereinafter abbreviated to "S") 101, it is determined whether or not an obstacle ahead is recognized by the front environment recognizer 20.

When the obstacle ahead is recognized as a result of the determination in S101, the control unit 10 proceeds to S102, and when the obstacle ahead is not recognized, it exits the program.

When proceeding to S102 since the obstacle ahead is recognized in S101, the control unit 10 divides the relative distance Lobj to the obstacle ahead of the vehicle 1 by the relative speed Vfo to the obstacle to calculate the time-to-collision TTC.

Then, the control unit 10 proceeds to S103 so as to compare the time-to-collision TTC and the predetermined threshold value Tc1. When the time-to-collision TTC is shorter than the predetermined threshold value Tc1 (TTC<Tc1), so that the possibility of the collision between the vehicle 1 and the obstacle ahead is determined to be high, the control unit 10 proceeds to S104. On the contrary, when the time-to-collision TTC is not more than the threshold value Tc1 (TTC≥Tc1), so that the possibility of the collision between the vehicle 1 and the obstacle is determined to be low, the control unit 10 exits the program.

When proceeding to S104 since the possibility of the collision with the vehicle 1 is determined to be high in S103, the control unit 10 refers to the engine automatic stop execution flag FIS from the engine automatic stop controller 30 and the brake negative pressure Pbv from the brake negative pressure sensor 40 so as to determine whether the engine is automatically stopped because the engine automatic stop execution flag FIS is set (FIS=1), or the brake negative pressure Pbv is higher than the set pressure Pct (Pbv>Pc1).

In the case of FIS=1 or Pbv>Pc1 as a result of the determination, it is determined that the negative pressure of the brake booster is insufficient, so that the control unit 10 proceeds to S105. In the case of FIS=0 and Pbv≤Pc1, it is determined that the negative pressure of the brake booster is sufficient, so that the control unit 10 exits the program.

When proceeding to S105 because it is determined in S105 that the negative pressure of the brake booster is insufficient, the control unit 10 determines whether the obstacle ahead is a vehicle or not. When the front environment recognizer 20 recognizes that the obstacle ahead is a vehicle, the control unit 10 proceeds to S106. When the obstacle ahead is not recognized as a vehicle, the control unit 10 jumps to S109 to output a signal to the brake controller 50, thereby starting the pump of the brake driver 51. Then, the control unit 10 proceeds to S110 to realize the pre-fill function in which the brake pad of each wheel is pressed against the braking surface of the disk rotor, and then, exits the program.

When the control unit proceeds to S106 since the obstacle ahead is recognized as the vehicle, the control unit 10 reads a lap ratio Rol between the vehicle 1 and the vehicle ahead in the widthwise direction, and determines whether the lap ratio Rol exceeds a predetermined threshold value Rc1 (e.g., 20%) or not.

When the lap ratio Rol exceeds the predetermined threshold value Rc1 (Rol>Rc1) as a result of the determination in S106, the control unit 10 determines that it is difficult to avoid the collision between the vehicle 1 and the vehicle ahead only by steering, so that it proceeds to S107. On the other hand, when the lap ratio Rol is not more than the predetermined threshold value Rc1 (Rol≤Rc1), the control unit 10 determines that it is possible to avoid the collision between the vehicle 1 and the vehicle ahead by steering, and exits the program.

When proceeding to S107 as a result of the determination of Rol>Rc1 in S106, the control unit 10 determines whether the brake lamp of the vehicle ahead is turned on or not. When the brake lamp is turned on as a result of the determination, the control unit 10 jumps to S109 to output a signal to the brake controller 50, thereby starting the pump of the brake driver 51. Then, the control unit 10 proceeds to S110 to realize the pre-fill function in which the brake pad of each wheel is pressed against the braking surface of the disk rotor, and then, exits the program.

On the contrary, when the brake lamp of the vehicle ahead is not turned on, the control unit 10 proceeds to S108 where it is determined whether a red signal is recognized or not by the front environment recognizer 20. When the red signal is recognized as a result of the determination, the control unit 10 jumps to S109 to output a signal to the brake controller 50, thereby starting the pump of the brake driver 51. Then, the control unit 10 proceeds to S110 to realize the pre-fill function in which the brake pad of each wheel is pressed against the braking surface of the disk rotor, and then, exits the program.

On the contrary, when the red signal is determined not to be recognized in S108 (when a traffic light cannot be recognized, or when a signal of the traffic light is blue), the control unit 10 exits the program. Specifically, since the signal of the traffic light is blue, and the brake pedal of the vehicle ahead is not depressed, it is considered that the vehicle ahead does not stop, but continues to drive. Therefore, the execution of the pre-fill function for the brake is prevented.

As described above, in the embodiment of the present invention, the control unit 10 calculates the time-to-collision TTC to the obstacle ahead. When the time-to-collision TTC is shorter than the predetermined threshold value Tc1, which means the possibility of the collision between the obstacle and the vehicle 1 is determined to be high, and in at least either one of cases in which the engine automatic stop controller 30 automatically stops the engine and in which the brake negative pressure Pbv is higher than a set pressure Pc1 so that the negative pressure of the brake booster is insufficient, the control unit 10 outputs a signal to the brake controller 50 so as to start the pump of the brake driver 51 for realizing the prefill function in which the brake pad of each wheel is pressed against the braking surface of the disc rotor. Accordingly, even if the engine is stopped, the brake assist is executed with satisfactory pressure increasing performance with excellent response, whereby a desired safety performance can be exhibited. Consequently, the present embodiment can satisfactorily secure the function of avoiding the collision with the obstacle ahead, while enhancing fuel efficiency by an engine automatic stop function and taking effective measures to environmental problems.

In the present embodiment, the engine automatic stop controller 30 employs an idle stop system for automatically stopping the engine. However, the present invention is applicable to an engine automatic stop function in a hybrid vehicle.

The invention claimed is:
1. A vehicle driving support device for a vehicle including a brake booster that uses a negative pressure of an engine to provide a brake pressure to each wheel cylinder in response to a braking operation by a driver and a brake driver including a pump to be activated to apply a brake pressure to each wheel cylinder independently of the brake booster, the vehicle driving support device comprising:
 a front environment recognizing unit configured to recognize an environment in front of the vehicle;
 a collision determining unit configured to make a determination through a comparison between an evaluation value, by which a possibility of collision between an obstacle in front of the vehicle and the vehicle is set, and a predetermined threshold value when the front environmental recognizing unit recognizes the obstacle;
 an engine automatic stop control unit configured to automatically stop the engine while the vehicle is moving, by outputting an engine stop signal, when a driving condition set in advance is established so as to reduce fuel consumption;
 a negative pressure sensor configured to detect a negative pressure of the brake booster; and
 a brake control unit configured to activate the pump of the brake driver for prefilling the brake pressure to the wheel cylinder so as to execute the brake assist to a coming braking operation by the driver with sufficient pressure-rising performance when the collision determining unit determines the possibility of collision is high in a case that the engine has been stopped by the engine automatic stop control unit or that the negative pressure of the brake booster detected by the negative pressure sensor is insufficient.

2. The vehicle driving support device according to claim 1, wherein the front environment recognizing unit includes a camera.

3. The vehicle driving support device according to claim 1, wherein, when the front environment recognizing unit does not recognize the obstacle as a vehicle ahead, the brake control unit is configured to activate the pump of the brake driving unit, when the collision determining unit determines that the possibility of the collision between the obstacle and the vehicle is high.

4. The vehicle driving support device according to claim 1, wherein, when the front environment recognizing unit recognizes that the obstacle is a vehicle ahead, the brake control unit is configured to calculate an overlap ratio between the vehicle and the vehicle ahead in the widthwise direction, and when the overlap ratio does not exceed a predetermined threshold value, the brake control unit is configured to cancel the activation of the pump of the brake driving unit.

5. The vehicle driving support device according to claim 1, wherein, when the front environment recognizing unit recognizes the obstacle as a vehicle ahead, a brake lamp of the vehicle ahead is turned off, and the front environment recognizing unit detects a blue signal, the brake control unit is configured to cancel the activation of the pump of the brake driving unit.

6. A vehicle driving support device for a vehicle including a brake booster that uses a negative pressure of an engine to provide a brake pressure to each wheel cylinder in response to a braking operation by a driver and a brake driver including a pump to be activated to apply a brake pressure to each wheel cylinder independently of the brake booster, the vehicle driving support device comprising:
a front environment recognizing unit configured to recognize an environment in front of the vehicle;
a collision determining unit configured to make a determination through a comparison between an evaluation value, by which a possibility of collision between an obstacle in front of the vehicle and the vehicle is set, and a predetermined threshold value when the front environmental recognizing unit recognizes the obstacle;
an engine automatic stop control unit configured to automatically stop the engine while the vehicle is moving, by outputting an engine stop signal, when a driving condition set in advance is established so as to reduce fuel consumption; and
a brake control unit configured to activate the pump of the brake driver for prefilling the brake pressure to the wheel cylinder so as to execute the brake assist to a coming braking operation by the driver with sufficient pressure-rising performance when the collision determining unit determines the possibility of collision is high in a case that the engine has been stopped by the engine automatic stop control unit.

7. The vehicle driving support device according to claim 6, wherein the front environment recognizing unit includes a camera.

8. The vehicle driving support device according to claim 6, wherein, when the front environment recognizing unit recognizes that the obstacle is a vehicle ahead, the brake control unit is configured to calculate an overlap ratio between the vehicle and the vehicle ahead in the widthwise direction, and when the overlap ratio does not exceed a predetermined threshold value, the brake control unit is configured to cancel the activation of the pump of the brake driving unit.

9. The vehicle driving support device according to claim 6, wherein, when the front environment recognizing unit recognizes the obstacle as a vehicle ahead, a brake lamp of the vehicle ahead is turned off, and the front environment recognizing unit detects a blue signal, the brake control unit is configured to cancel the activation of the pump of the brake driving unit.

10. A vehicle driving support device for a vehicle including a brake booster that uses a negative pressure of an engine to provide a brake pressure to each wheel cylinder in response to a braking operation by a driver and a brake driver including a pump to be activated to apply a brake pressure to each wheel cylinder independently of the brake booster, the vehicle driving support device comprising:
a front environment recognizing unit configured to recognize an environment in front of the vehicle;
a collision determining unit configured to make a determination through a comparison between an evaluation value, by which a possibility of collision between an obstacle in front of the vehicle and the vehicle is set, and a predetermined threshold value when the front environmental recognizing unit recognizes the obstacle;
a negative pressure sensor configured to detect a negative pressure of the brake booster; and
a brake control unit configured to activate the pump of the brake driver for prefilling the brake pressure to the wheel cylinder so as to execute the brake assist to a coming braking operation by the driver with sufficient pressure-rising performance when the collision determining unit determines the possibility of collision is high in a case that the negative pressure of the brake booster detected by the negative pressure sensor is insufficient.

11. The vehicle driving support device according to claim 10, wherein the front environment recognizing unit includes a camera.

12. The vehicle driving support device according to claim 10, wherein, when the front environment recognizing unit recognizes that the obstacle is a vehicle ahead, the brake control unit is configured to calculate an overlap ratio between the vehicle and the vehicle ahead in the widthwise direction, and when the overlap ratio does not exceed a predetermined threshold value, the brake control unit is configured to cancel the activation of the pump of the brake driving unit.

13. The vehicle driving support device according to claim 10, wherein, when the front environment recognizing unit recognizes the obstacle as a vehicle ahead, a brake lamp of the vehicle ahead is turned off, and the front environment recognizing unit detects a blue signal, the brake control unit is configured to cancel the activation of the pump of the brake driving unit.

* * * * *